(12) United States Patent
Tarozzi

(10) Patent No.: US 12,611,797 B2
(45) Date of Patent: Apr. 28, 2026

(54) PROCESS AND SYSTEM FOR THE MANUFACTURING OF SLABS MADE OF RESIN-BONDED MINERAL GRITS

(71) Applicant: SITI—B&T GROUP S.p.A., Formigine (IT)

(72) Inventor: Fabio Tarozzi, Formigine (IT)

(73) Assignee: SITI—B&T GROUP S.p.A., Formigine (IT)

( * ) Notice: Subject to any disclaimer, the term of this patent is extended or adjusted under 35 U.S.C. 154(b) by 132 days.

(21) Appl. No.: 18/264,679

(22) PCT Filed: Feb. 14, 2022

(86) PCT No.: PCT/IB2022/051296
§ 371 (c)(1),
(2) Date: Aug. 8, 2023

(87) PCT Pub. No.: WO2022/172242
PCT Pub. Date: Aug. 18, 2022

(65) Prior Publication Data
US 2024/0051181 A1      Feb. 15, 2024

(30) Foreign Application Priority Data
Feb. 15, 2021      (IT) ........................ 102021000003353

(51) Int. Cl.
*B29C 64/00*          (2017.01)
*B28B 1/00*           (2006.01)
(Continued)

(52) U.S. Cl.
CPC ............ *B28B 11/001* (2013.01); *B28B 1/005* (2013.01); *B28B 1/08* (2013.01); *B29C 67/244* (2013.01);
(Continued)

(58) Field of Classification Search
CPC .............................. B28B 1/005; B28B 11/001
See application file for complete search history.

(56) References Cited

U.S. PATENT DOCUMENTS 4,068,030 A * 1/1978 Witman ................... D06N 3/06
427/210
4,406,662 A      9/1983 Beran et al.
(Continued)

FOREIGN PATENT DOCUMENTS

CN          103 753 996 B      11/2015
CN          105 383 197 B      11/2018
(Continued)

*Primary Examiner* — Nicholas Krasnow
(74) *Attorney, Agent, or Firm* — ASLAN LAW, P.C.

(57) ABSTRACT

A process (method, system, etc.) for the manufacturing of slabs made of resin-bonded mineral grits comprises at least the phases of: supply of at least one mixture made of mineral grits and resins; compaction of the mineral grits and resins to obtain a compacted slab; hardening of the compacted slab to obtain a finished slab provided with at least one exposed surface and having an intrinsic degree of porosity; decoration with ink by digital printing of the exposed surface according to at least one predefined design; and, prior to the decoration and subsequently to the hardening, at least one phase of increase in the intrinsic degree of porosity of the finished slab, adapted to promote the penetration of the ink in the finished slab.

9 Claims, 2 Drawing Sheets

(51) Int. Cl.

| | |
|---|---|
| *B28B 1/08* | (2006.01) |
| *B28B 11/00* | (2006.01) |
| *B29C 67/24* | (2006.01) |
| *B41M 5/00* | (2006.01) |
| *B29L 31/00* | (2006.01) |

(52) U.S. Cl.
 CPC .......... *B41M 5/0064* (2013.01); *B41M 5/007* (2013.01); *B29C 2795/007* (2013.01); *B29L 2031/722* (2013.01)

(56) References Cited

U.S. PATENT DOCUMENTS

| | | | | |
|---|---|---|---|---|
| 4,971,854 A * | 11/1990 | Hinishi | ................ | B44C 1/1712 |
| | | | | 503/227 |
| 6,300,279 B1 * | 10/2001 | Macedo | .............. | B41M 5/0358 |
| | | | | 503/227 |
| 7,785,098 B1 * | 8/2010 | Appleby | ................ | G21K 1/025 |
| | | | | 264/319 |
| 9,833,982 B2 * | 12/2017 | Martin | ................. | B32B 29/005 |
| 10,024,584 B1 * | 7/2018 | Peet | ..................... | F25D 31/006 |

| | | | | |
|---|---|---|---|---|
| 2002/0043327 A1 * | 4/2002 | Macedo | ................. | B32B 38/14 |
| | | | | 8/468 |
| 2002/0102420 A1 * | 8/2002 | Krebs | ....................... | G09F 7/04 |
| | | | | 428/460 |
| 2011/0189440 A1 * | 8/2011 | Appleby | ................. | B29C 33/38 |
| | | | | 523/435 |
| 2013/0212046 A1 * | 8/2013 | Henshue | .............. | B44C 5/0446 |
| | | | | 427/256 |
| 2015/0219921 A1 * | 8/2015 | Zhang | ................... | G02C 5/008 |
| | | | | 156/308.2 |
| 2017/0120474 A1 * | 5/2017 | Oldorff | ..................... | B44C 5/04 |
| 2019/0099915 A1 * | 4/2019 | Adams | ................. | B41M 5/0047 |
| 2020/0071940 A1 * | 3/2020 | Lee | ......................... | C08L 27/06 |
| 2021/0205842 A1 * | 7/2021 | Oldorff | ..................... | B44C 5/04 |
| 2023/0264392 A1 * | 8/2023 | Andres Alemany | ..... | A47K 3/40 |
| | | | | 264/261 |

FOREIGN PATENT DOCUMENTS

| | | | |
|---|---|---|---|
| CN | 107 160 882 B | | 1/2019 |
| EP | 3 479 910 A1 | | 5/2019 |
| JP | 2007 152149 A | | 6/2007 |
| WO | WO 2015/080246 A1 | | 6/2015 |
| WO | WO 2019/239351 A1 | | 12/2019 |

* cited by examiner

PROCESS AND SYSTEM FOR THE MANUFACTURING OF SLABS MADE OF RESIN-BONDED MINERAL GRITS

CROSS-REFERENCE TO RELATED APPLICATIONS

This application claims priority to IT patent application No. 102021000003353 filed on Feb. 15, 2021, and this application claims priority to and is a 371 of international PCT Application No. PCT/IB2022/051296 filed on Feb. 14, 2022, the entire contents of which are hereby incorporated by reference.

TECHNICAL FIELD

The present invention relates to a process and system for the manufacturing of slabs made of resin-bonded mineral grits.

BACKGROUND ART

In several production sectors, such as e.g. building and furnishing, but not only, slabs made of resin-bonded mineral grits are widely used today.

In terms of aesthetic and functional characteristics, these slabs are fully comparable to the slabs made directly from natural materials such as marble, granite or the like.

Compared to the latter, however, the slabs made of resin-bonded mineral grits also have other important advantages.

First of all, they can be made in numerous variants distinguished by colors and/or designs and/or decorative effects which are not obtainable by using the natural materials mentioned above: in other words, therefore, their production is more versatile and customizable to meet the customers' demands.

Another advantage consists in the fact that, since the material obtained is less porous, e.g., than marble, it is substantially watertight by the most commonly used liquids and, in addition, is more resistant to stains.

For these reasons, these slabs are widely used, e.g., in the construction of kitchen or bathroom countertops or other similar applications.

The aforementioned slabs are manufactured starting from a mixture typically comprising minerals in the granular form (e.g. marble, granite, glass, mirror fragments, and/or others) as well as quartz powder and, of course, resins which serve as binders.

Once prepared, this mixture is deposited inside a mould, in which the molding cavity has the dimensions of the object to be obtained (unless any shrinkage that may occur in the subsequent manufacturing phases).

The mixture is then decorated in order to recreate the particular aesthetic effects present in natural rocks.

For example, decorations are carried out in a pass through material in order to obtain the so-called "grains", i.e. streaks of a different color with respect to the basic material, having an irregular pattern and crossing the entire thickness thereof.

The mould is then introduced into a compaction appliance wherein the mixture is pressed inside the cavity, and subjected, at the same time, to a vibrating action, so as to obtain a compacted slab.

In addition to this, the compaction of the slabs is expected to take place in a depressurized environment, i.e. at a lower pressure than atmospheric pressure: in fact, the elimination of air from the forming area further promotes the compaction of the mixture materials.

Then, the compacted slab is subjected to a final phase of hardening in order to give it the desired mechanical strength to obtain a finished slab.

However, the processes and systems of known type have some drawbacks mainly related to the difficulty of obtaining slabs made of mineral grits provided with valuable decorative effects and that remain unchanged throughout the working cycle.

In fact, after pressing, the slabs have an uneven surface and need to be polished. This operation implies the removal of material, which, even if partial, can lead to the alteration of the surface decorations applied to the slab in the previous phases, thus invalidating the entire work.

In the processes of known type, it is also ascertained the difficulty to reproduce the surface appearance of natural rocks or to vary the surface finishing of the slabs in order to achieve the desired aesthetic effect.

Some processes and systems for the manufacturing of slabs are known from US 2019/099915 A1, CN 103753996 B, U.S. Pat. No. 4,406,662 A, CN 105383197 B, WO 2015/080246 A1.

DESCRIPTION OF THE INVENTION

The main aim of the present invention is to devise a process and system for the manufacturing of slabs made of resin-bonded mineral grits which enable the simple and reliable manufacture of slabs made of mineral grits with decorative effects which remain unaltered during the entire work and following the finishing operations.

A further object of the present invention is to devise a process and system for the manufacturing of slabs made of resin-bonded mineral grits, which allow a wide variety of decorative effects to be obtained simply and reliably.

Another object of the present invention is to devise a process and system for the manufacturing of slabs made of resin-bonded mineral grits, which allow the aforementioned drawbacks of the prior art to be overcome within a simple, rational, easy and effective to use as well as affordable solution.

The aforementioned objects are achieved by the present process for the manufacturing of slabs made of resin-bonded mineral grits having the characteristics of the claimed invention.

The aforementioned objects are achieved by the present system for the manufacturing of slabs made of resin-bonded mineral grits having the characteristics of the claimed invention.

BRIEF DESCRIPTION OF THE DRAWINGS

Other characteristics and advantages of the present invention will become more apparent from the description of a preferred, but not exclusive, embodiment of a process and system for the manufacturing of slabs made of resin-bonded mineral grits, illustrated by way of an indicative, yet non-limiting example, in the accompanying tables of drawings wherein.

EMBODIMENTS OF THE INVENTION

Figure 1:
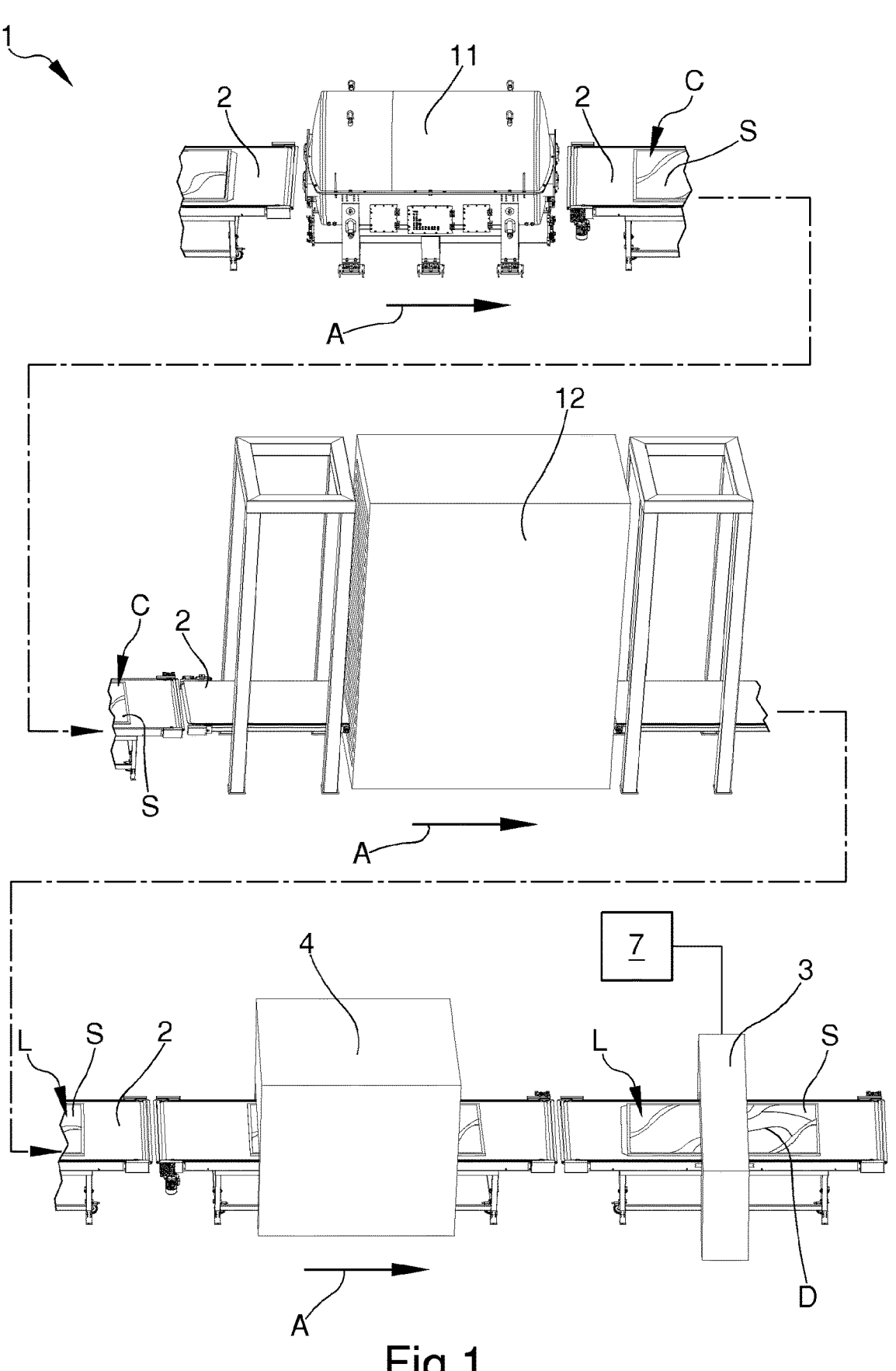
FIG. 1 is a schematic representation in a perspective view of a system for the manufacturing of slabs made of resin-bonded mineral grits according to the invention.

With particular reference to these figures, reference numeral 1 globally indicates a system for the manufacturing of slabs made of resin-bonded mineral grits.

Within the present disclosure, mineral grits and resins are understood to mean minerals in granular form, e.g., marble, granite, glass, mirror fragments, and/or the like, as well as quartz powder, while resins may be, e.g., of the thermosetting type, especially for building and furnishing applications.

The system 1 comprises at least one supporting surface 2 movable along a direction of forward movement A, dispensing means of at least one mixture of mineral grits and resins on the supporting surface 2, compaction means 11 of the mineral grits and resins to obtain at least one compacted slab C and hardening means 12 of the compacted slab C to obtain a finished slab L.

The dispensing means, not shown in detail in the figures, are of the type of a hopper, which, as a result of the movement of the supporting surface 2 along the direction of forward movement A, deposits the mixture of mineral grits and resins in such a way as to obtain a laying surface facing downwards and an exposed surface S facing upwards.

In the embodiment shown in the figures, the dispensing of the mixture is carried out inside a forming mould. It cannot, however, be ruled out that the dispensing of the mixture be carried out directly on the supporting surface 2.

The compaction means 11 are of the known type and, in particular, allow making compaction by means of vibrating-pressure under vacuum.

Through this operation, the mineral grits and resins are pressed inside the forming mould, and simultaneously subjected to a vibrating action, which facilitates the adhesion of the grits themselves.

At the same time, a suction operation is carried out aimed at creating a depressurized environment in order to eliminate the air present in the gaps between the mineral grits and further optimize compaction.

The hardening means 12 comprise a heated chamber inside which catalysis of the resins present in the mixture of grits takes place in order to obtain the finished slab L provided with the desired mechanical and physical properties. The hardening means 12 then perform a first heating of the compacted slab C. This first heating is preferably carried out at a temperature comprised between 100° C. and 150° C.

The finished slab L is therefore provided with at least one exposed surface S intended, in use, to face outwards.

The supporting surface 2 is then adapted to support the finished slab L made of resin-bonded mineral grits with the exposed surface S facing upwards.

The supporting surface 2 is composed of, e.g., a conveyor belt, a roller conveyor, or the like.

The supporting surface 2 may be of the continuous or discontinuous type. More particularly, the compaction means 11, the hardening means 12 and the treatment means 4 may be arranged in succession with each other along the same supporting surface 2.

Alternatively, the supporting surface 2 may be of the discontinuous type, i.e., it may have interruptions, whereby the compaction means 11 and the hardening means 12 are arranged in succession with each other along a first supporting surface and the treatment means 4 are arranged along a second supporting surface, arranged downstream of the first supporting surface with respect to the direction of forward movement of the finished slab L and separate from the first supporting surface itself.

The term "finished slab" used in the present disclosure therefore means a slab that is ready for use, i.e. that does not require any further work before being used. The finished slab is, therefore, a slab that has already undergone the compaction and hardening phases and that, if necessary, has also undergone one or more surface finishing treatments such as, e.g., sanding.

The finished slab L is also provided with an intrinsic degree of porosity.

In the context of the present disclosure, the expression "degree of porosity" means the ratio of the volume defined by the empty spaces between the grit particles to the total volume of the finished slab L. The intrinsic degree of porosity of a finished slab L can be very low, even close to zero.

The finished slab L can have a decorative effect, of the type e.g. of grains, which affects the exposed surface S or the entire thickness of the slab itself.

The decorative effect is given, e.g., by the use of two or more mixtures of mineral grits and resins, which differ from each other by at least one of color, composition, grain size, properly distributed to form the grains.

The system 1 comprises at least one digital printing device 3 adapted to dispense at least one ink on the exposed surface S according to at least one predefined design D. The digital printing device 3 is located downstream of the hardening means 12 with respect to the direction of forward movement A and, therefore, the decoration of the slab by means of the digital printing device 3 is carried out following the hardening of the compacted slab C.

The function of the digital printing device 3 is to make a decoration according to a particular predefined design D and/or to finish the decorations already present on the exposed surface S.

The digital printing device 3 comprises a plurality of print heads which are movable with respect to the exposed surface S and adapted to dispense ink according to the predefined design D.

Conveniently, the system 1 comprises at least one electronic unit 7 operatively connected to the digital printing device 3, configured to store at least one predefined design D and to operate the print heads in accordance therewith.

According to a possible embodiment of the present invention, the ink is of the type of a UV ink. Appropriately, the digital printing device 3 comprises ink activation means, not shown in detail in the figures, of the type, e.g., of UV lamps.

Alternatively or in combination thereof, the ink is of the type of a sublimation ink. In such a case, the digital printing device 3 also comprises means for fixing the sublimation ink.

The system 1 may also comprise finishing means, not shown in the figures, which are adapted to superficially finish the finished slab L. The finishing means are preferably arranged downstream of the digital printing device 3, although it cannot be ruled out that they may also be arranged upstream of the digital printing device 3.

Specifically, the finishing means are adapted to make at least one sanding of the exposed surface S of the finished slab L.

According to the invention, the system 1 comprises treatment means 4 of the finished slab L which are adapted to increase the intrinsic degree of porosity and positioned between the hardening means 12 and the digital printing device 3.

The function of the treatment means 4 is, therefore, to increase the volume of the empty spaces of the finished slab L with respect to the total volume thereof.

In particular, the treatment is performed at least on the exposed surface S.

The treatment of the finished slab L aimed at increasing the degree of porosity is, therefore, carried out on the already hardened slab.

The increase in the degree of porosity has the function of promoting the penetration of the ink into the finished slab L during the subsequent phase of decoration.

The ink is thus able to infiltrate among the pores present on the exposed surface S in the thickness of the finished slab L.

In this way, the decorative effect given by the predefined design D is preserved even after any sanding of the exposed surface S.

Advantageously, the treatment means 4 comprise at least one heating device which is adapted to heat at least the exposed surface S.

Therefore, the treatment means 4 and the hardening means 12 perform two separate heating operations and, in particular, while the hardening means 12 perform a first heating operation on the compacted slab C, the treatment means 4 perform a second heating operation on the finished slab L.

In the path between exiting the hardening means 12 and entering the treatment means 4, the finished slab L has a chance to cool down, and then be heated again by the treatment means themselves.

Specifically, the treatment means 4 comprise a kiln inside which the finished slab L is inserted during the movement along the direction of forward movement A.

More particularly, the heating of the finished slab L is performed with the exposed surface S free, i.e. without the aid of covers or other covering elements. Usefully, the second heating operation carried out by the treatment means 4 is performed at a temperature comprised between 30° and 180° C.

Preferably, the second heating operation of the finished slab L is carried out at a temperature comprised between 70° and 100° C. in the case of the ink used being of the UV type and comprised between 150° and 180° C. in the case of the ink used being of the sublimation type.

Figures 2, 3:
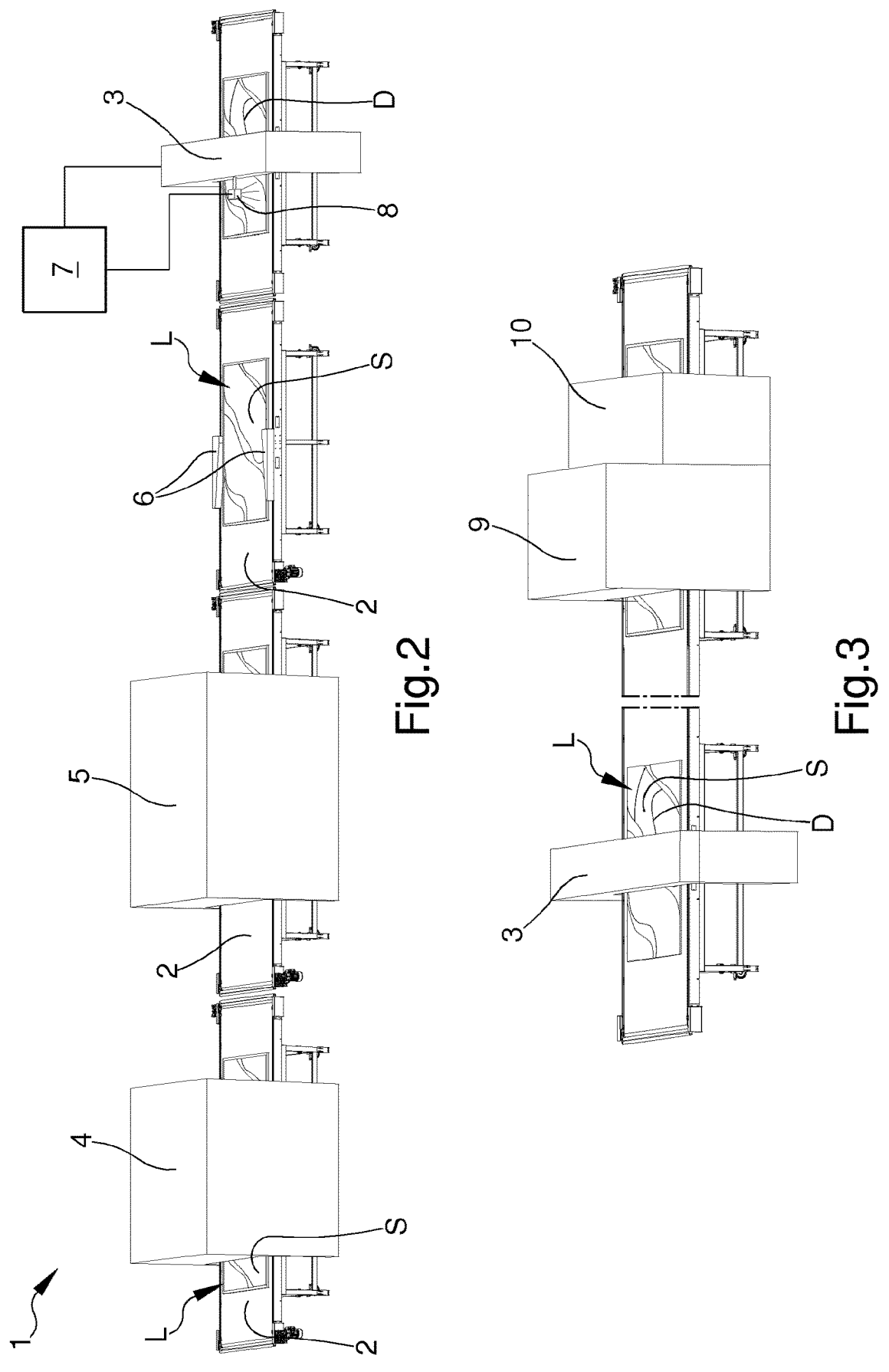
FIG. 2 is a schematic representation in a perspective view of a system for the manufacturing of slabs made of resin-bonded mineral grits according to the invention, in accordance with a possible embodiment.
FIG. 3 is a schematic representation in a perspective view of a system for the manufacturing of slabs made of resin-bonded mineral grits according to the invention, in accordance with a further possible embodiment.

In the embodiment shown in FIG. 2, the system 1 also comprises application means 5 for applying a fixative of the ink to the exposed surface S.

The fixative allows promoting the adhesion of the ink to the exposed surface S. The application means 5 comprise at least one of a spray device, a dispensing roller, or the like.

In the embodiment shown in the figures, the application means 5 are arranged between the treatment means 4 and the digital printing device 3.

In this way, the fixative is smoothly dispensed inside the pores and allows for optimal ink adhesion even inside the pores themselves. In addition, fixatives generally consist of volatile substances which could evaporate if applied prior to heating.

It cannot, however, be ruled out that the application means 5 be arranged upstream of the treatment means 4 with respect to the direction of forward movement A.

The system 1 comprises mutual alignment means 6 of the exposed surface S and of the predefined design D.

The alignment means 6 allow the decoration to be carried out in an extremely precise and repeatable manner. The predefined design D is, in fact, specifically created on the basis of the dimensions of the finished slab L; variations in the position of the finished slab L on the supporting surface 2, even if minimal, can lead to very evident aesthetic defects which can invalidate the entire process.

The alignment means 6 may be of the mechanical type, such as e.g. of the type of rollers or sliders adapted to center the finished slab L with respect to the supporting surface 2.

In particular, the alignment means 6 are adapted to rotate and/or shift the finished slab L on the supporting surface 2.

Alternatively or in combination thereof, the alignment may be of the electronic type.

The electronic unit 7 is, in fact, configured to store the predefined design D in a reference position and to operate the print heads of the digital printing device 3 according to the predefined design D.

Conveniently, the electronic unit 7 is also configured to move the predefined design D with respect to the reference position, depending on the position of the exposed surface S.

More in detail, the predefined design D is digitally moved so that, following the application to the finished slab L, it is already aligned with the exposed surface S.

Advantageously, the system 1 comprises detection means 8 of the arrangement of the exposed surface S with respect to a preset reference position, wherein the detection means 8 are operatively connected to the electronic unit 7.

The detection means 8 are of the type, e.g., of a vision sensor configured to acquire at least one image of the exposed surface S with respect to the supporting surface 2 and to generate a corresponding position signal.

The detection means 8 are configured to transmit the position signal to the electronic unit 7, which moves the predefined design D according to this signal. The electronic unit 7 is then configured to operate the digital printing device 3 in order to dispense the predefined design D so moved.

Specifically, the electronic unit 7 selectively operates only those print heads necessary for the predefined design D to be applied with a predefined inclination and equal to that of the exposed surface S.

In the embodiment shown in FIG. 3, the system 1 also comprises dispensing means 9 of a coating material on the exposed surface S.

The coating material is of the type e.g. of a glaze, and is applied to the exposed surface S to protect the finished decorative effect or to give more gloss to the exposed surface itself.

The dispensing means 9 are, e.g., of the type of dispensing rollers.

The dispensing means 9 are arranged downstream of the digital printing device 3 with respect to the direction of forward movement A.

Preferably, the dispensing means 9 are arranged downstream of the finishing means so as to allow dispensing the coating material following any sanding of the exposed surface S.

The system 1 also comprises at least one attachment device 10 of the coating material on the exposed surface S.

The attachment device 10 is, e.g., of the type of a kiln, a UV lamp, or the like, and is selected depending on the type of coating material.

The operation of the present system 1 in the execution of the process according to the invention is as follows.

The process covered by the present invention comprises, first of all, a supply of at least one finished slab L made of resin-bonded mineral grits provided with at least one exposed surface S and having an intrinsic degree of porosity.

In other words, the process comprises at least the following phases of:

supply of at least one mixture of mineral grits and resins;

compaction of said mineral grits and resins to obtain a compacted slab C;

hardening of said compacted slab C to obtain said finished slab L.

The mixture is dispensed on the supporting surface 2. More specifically, the mixture is dispensed inside a forming mold.

This phase is carried out through the dispensing means.

At this point, the process comprises the compaction of the mixture to obtain the compacted slab C, by means of vibrating-pressure under vacuum, performed using the compaction means 11.

Thereafter, the process comprises the phase of hardening which is carried out by means of the hardening means.

More particularly, the phase of hardening is carried out by means of a first heating operation of the compacted slab C. This first heating operation is carried out at a temperature comprised between 100° C. and 150° C.

The finished slab L is placed on the supporting surface 2, which is then moved along the direction of forward movement A to allow the various phases of the process to be carried out.

Specifically, the finished slab L is placed on the supporting surface 2 with the exposed surface S facing upwards.

The process comprises a phase of decoration with ink by digital printing of the exposed surface S according to at least one predefined design D.

The decoration with ink by digital printing of the exposed surface S is, therefore, performed after the hardening phase of the compacted slab C.

The phase of decoration is performed using the digital printing device 3.

According to the invention, the process comprises, subsequently to hardening and prior to decoration, at least one phase of increase in the intrinsic degree of porosity of the finished slab L, which is adapted to promote the penetration of the ink in the finished slab L.

More in detail, the phase of increasing the degree of porosity is then performed on the already hardened finished slab L, that is, once the finished slab L has cooled down following the first heating operation mentioned above.

The increase in the degree of porosity allows the ink to infiltrate between the pores present on the exposed surface S, in the thickness of the finished slab L. The phase of increasing the degree of porosity is carried out by means of the treatment means 4.

Appropriately, the phase of increasing the degree of porosity is carried out by performing a second heating operation on the finished slab L at a temperature comprised between 30° and 180°.

The phase of increasing the degree of porosity of the finished slab L is therefore separate from and subsequent to the phase of hardening of the compacted slab C.

More specifically, the second heating operation for increasing the degree of porosity is carried out at a temperature comprised between 70° and 100° in the case of the ink used is of the UV type and between 150° and 180° in the case of ink of the sublimation type.

Advantageously, the phase of increasing the degree of porosity is carried out by heating at least the exposed surface S.

In more detail, the heating operation involves the entire finished slab L.

Conveniently, prior to the decoration, the process also comprises a phase of application of a fixative of the ink to the exposed surface S.

The phase of application is performed by means of the application means 5.

Advantageously, the process comprises a phase of mutually alignment of the exposed surface S and of the predefined design D as applied by digital printing. In particular, the alignment may be carried out mechanically by means of the alignment means 6. In such a case, the alignment is carried out by moving the finished slab L with respect to predefined design D as applied by digital printing.

Alternatively or in combination thereof, the alignment may be of the electronic type and is carried out by the electronic unit 7.

More specifically, the alignment is carried out by moving the predefined design D with respect to the finished slab L.

In other words, the predefined design is varied according to the actual position of the exposed surface S.

To this end, the process also comprises a phase of detecting the arrangement of the exposed surface S with respect to the supporting surface 2.

Detection is performed using the detection means 8.

Subsequently, the process comprises a phase of hardening the finished slab L to obtain a finished slab made of resin-bonded mineral grits.

The process may also comprise a phase of finishing, performed subsequently to the phase of decoration, performed using the finishing means.

Finishing is carried out by sanding the finished slab L and allows obtaining a smoother and more regular exposed surface S.

The particular solution of providing a phase of increase in the intrinsic degree of porosity of the finished slab L ensures that the ink penetrates at least partly into the finished slab itself and that the phase of finishing, following the removal of material, does not involve an alteration of the decorative effects given during the previous phases of work.

Conveniently, subsequently to the decoration, the process comprises a phase of dispensing a coating material on the exposed surface S.

Preferably, the phase of dispensing is performed subsequently to the sanding phase so as to allow dispensing the coating material following the removal of material from the exposed surface S.

Finally, the process comprises a phase of attachment of the coating material onto the exposed surface S. The phase of attachment is performed by means of the attachment device 10.

It has, in practice, been ascertained that the described invention achieves the intended objects, and in particular the fact is emphasized that the process and the system according to the invention make it possible to obtain slabs made of mineral grits provided with a wide variety of decorative effects.

This is possible thanks to the presence of treatment means adapted to increase the degree of porosity of the compacted slab and, consequently, to promote the penetration of the ink inside the slab itself.

The process and the system according to the invention allow manufacturing slabs made of mineral grits in a simple and reliable manner with decorative effects that remain unchanged during the entire work and after the finishing operations.

The invention claimed is:

1. A process for the manufacturing of slabs made of resin-bonded mineral grits comprising at least the phases of:

supply of at least one mixture made of mineral grits and resins;

compaction of said mineral grits and resins to obtain a compacted slab;

hardening of said compacted slab to obtain a finished slab provided with at least one exposed surface and having an intrinsic degree of porosity; wherein the phase of hardening is performed by means of a first heating operation of said compacted slab at a temperature comprised between 100° C. and 150° C.;

cooling down the finished slab after the first heating operation;

decoration with ink by digital printing of said exposed surface according to at least one predefined design; and prior to said decoration and subsequently to said hardening, at least one phase of increase in said intrinsic degree of porosity of the finished slab, adapted to promote the penetration of said ink in said finished slab, where the phase of increasing is performed by means of a second heating operation of at least said exposed surface carried out at a temperature comprised between 30° C. and 180° C. said phase of increasing the degree of porosity being performed after said phase of cooling down the finished slab.

2. The process according to claim 1, wherein said ink is of the type of a UV ink.

3. The process according to claim 1, wherein said ink is of the type of a sublimation ink.

4. The process according to claim 1, further comprising, prior to said decoration, a phase of application of a fixative of said ink to said exposed surface.

5. The process according to claim 1, further comprising: a phase of mutually alignment of said exposed surface and of said predefined design as applied by digital printing.

6. The process according to claim 5, wherein said alignment is carried out by means of movement of said finished slab with respect to said predefined design as applied by digital printing.

7. The process according to claim 5, wherein said alignment is carried out by means of movement of said predefined design with respect to said finished slab.

8. The process according to claim 1, wherein, subsequently to said decoration, further comprising: a phase of dispensing of a coating material on said exposed surface.

9. The process according to claim 8, further comprising: a phase of attachment of said coating material onto said exposed surface.

* * * * *